Nov. 7, 1961  W. C. GEORGE  3,007,622
CONTAINER
Filed Nov. 14, 1956  5 Sheets-Sheet 1
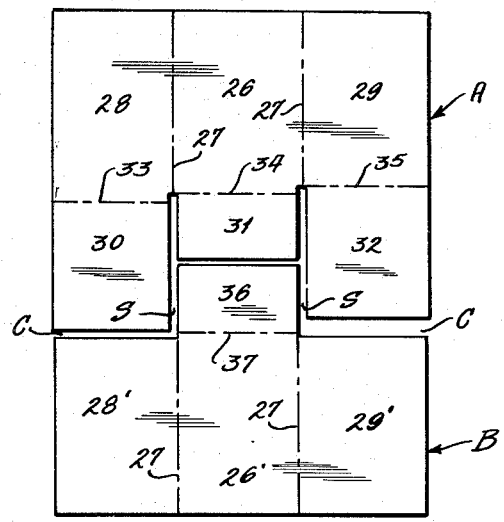
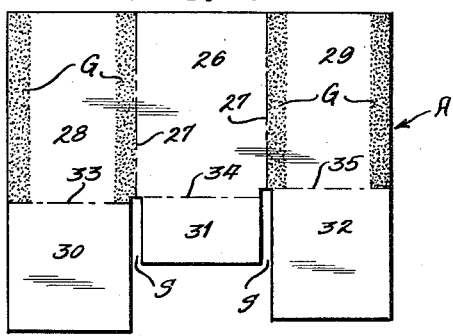
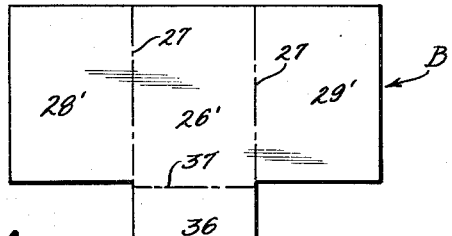
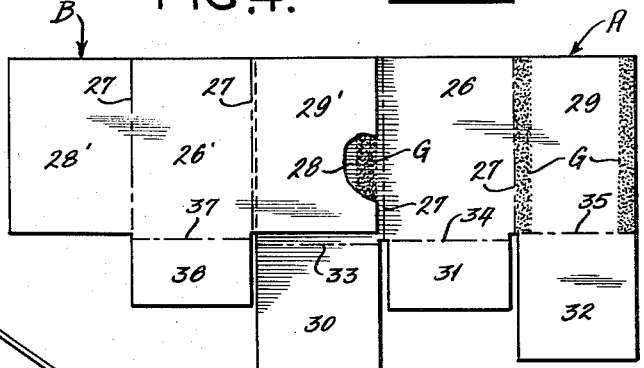
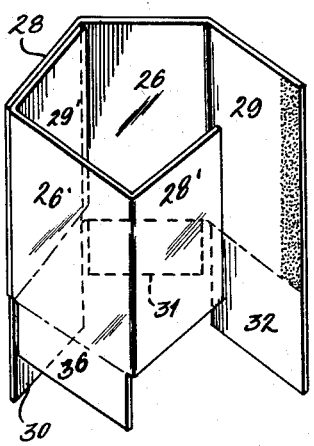
INVENTOR
WALTER C. GEORGE
BY William Nye
ATTORNEY Nov. 7, 1961 W. C. GEORGE 3,007,622
CONTAINER
Filed Nov. 14, 1956 5 Sheets-Sheet 2

INVENTOR
WALTER C. GEORGE
BY William Nye
ATTORNEY

Nov. 7, 1961 W. C. GEORGE 3,007,622
CONTAINER
Filed Nov. 14, 1956 5 Sheets-Sheet 3

INVENTOR
WALTER C. GEORGE
BY William Thye
ATTORNEY

Nov. 7, 1961 — W. C. GEORGE — 3,007,622
CONTAINER
Filed Nov. 14, 1956 — 5 Sheets-Sheet 4
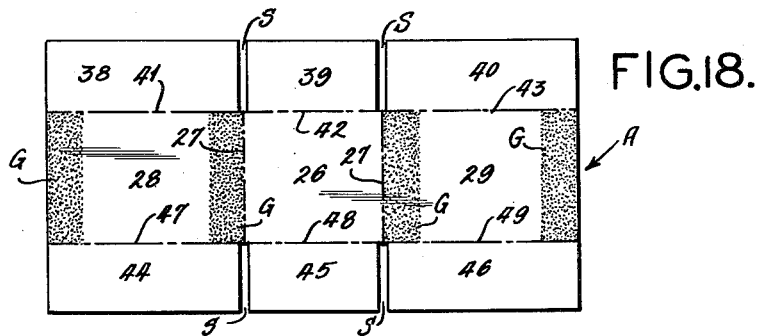
FIG.18.
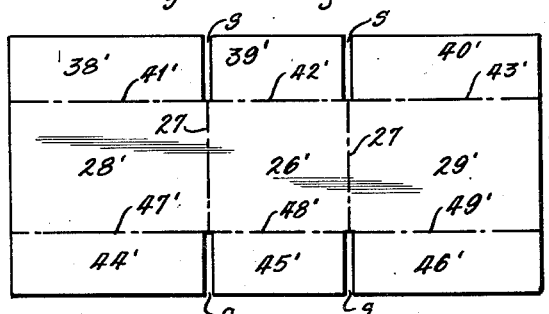
FIG.19.
FIG.20.
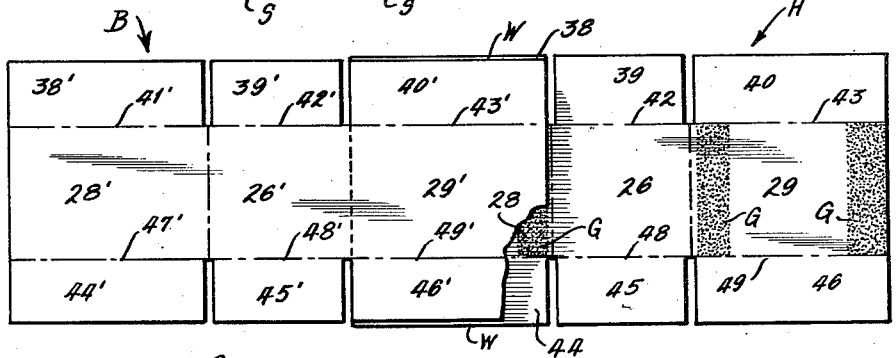
FIG.21.
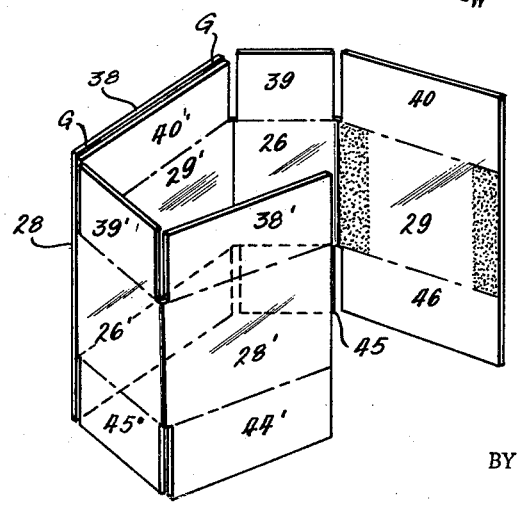
INVENTOR
WALTER C. GEORGE
BY William Thyl
ATTORNEY Nov. 7, 1961 W. C. GEORGE 3,007,622
CONTAINER
Filed Nov. 14, 1956 5 Sheets-Sheet 5

INVENTOR
WALTER C. GEORGE
BY William Thye
ATTORNEY.

United States Patent Office 3,007,622
Patented Nov. 7, 1961

3,007,622
CONTAINER
Walter C. George, St. Louis, Mo., assignor to Crown Zellerbach Corporation, San Francisco, Calif., a corporation of Nevada
Filed Nov. 14, 1956, Ser. No. 624,711
2 Claims. (Cl. 229—23)

This application is a continuation-in-part of co-pending application Serial No. 376,863, filed August 27, 1953, now abandoned.

This invention relates to collapsible, heavy-duty containers constructed of paperboard or other similar material, the blanks from which said containers are fabricated, and ways and means of folding and setting up the container.

The containers of the present invention are, of course, hollow and the body or wall structure comprising the same is unique in that certain opposed walls are fabricated from at least two overlapped panels which are especially secured and arranged with respect to each other and other opposed single panel wall structures in flat unfolded form so that the resultant body structure is sufficiently rigid so as to enable various articles and commodities to be stored therein and properly handled and shipped without a bulging of the walls or a crushing or breaking of the walls due to dropping of the same.

The wall structure may be used open-ended for certain articles and commodities or the same may have integral therewith a novel arrangement of closure flaps or, if preferred, a simple slip type closure or any other closure may be utilized at one or both ends of the panels comprising the wall structure.

In one embodiment of the invention, the completed container is adaptable for use for containing nails, spikes, bolts, screws and the like and serves more effectively to contain such articles than the conventional nail kegs in that the present container is indeed capable of receiving much more severe impacts without rupturing or bursting the same than the rigid wooden kegs in which nails are ordinarily stored and shipped. Then, too, in this embodiment of the invention, the present containers being foldable and collapsible, they can be shipped as such to the user who simply loads them with the articles and seals the flaps or other closure in any suitable manner.

In the other embodiment of the invention, which includes the novel wall or body structure of at least two overlapped panels in flat form prior to folding, there is provided a double sealing closure flap arrangement which, combined with the said body structure, is ideally suited for packing and shipping citrus fruits, vegetables and the like therein. Here again, the same advantages as hereinbefore recited are obtained.

While the two embodiments of the present invention have been set forth as adaptable for having packed certain articles of manufacture and citrus fruits, etc. therein, it is understood that any suitable commodities and articles may be packed into one or both of the containers.

With regard to the embodiment of the invention hereinbefore recited wherein the nails, etc. are to be packed and shipped, the same comprises two substantially identically formed body structures or sections each of which is closed at one end only and the only difference being that in opposite walls of the outer body member, conventional hand holes may be provided for convenience in separating these two body members when one is telescoped within the other. Of course, in order to obtain the telescoping of the two body structures or sections, the interior dimensions of the outer body structure must be just slightly greater than the exterior dimensions of the other body structure. In utilizing the two body structures, which hereinafter are referred to as inner and outer body structures or sections, the aforesaid wall structure is such that by the particular association and telescoping of the body structures and when fully telescoped, there results a body structure of the combined telescoped structures which consists of at least three superposed panels for each wall of the body structure.

With the aforementioned in mind, one object of the invention is to provide containers, tubes or the like which are rectangular in shape and comprise connected together walls which may be provided with end closure means, whether said means be integral with or separate from the wall, the said walls characterized by being composed of a predetermined plurality of secured together superimposed panels of substantially identical dimensions, which panels comprise certain opposed walls and a lesser number of said panels in other opposed walls, thus providing adequate stacking strength and resistance to outward deflection or bulging incident to the weight and nature of the commodity that may be packed therein.

Another object of the invention is to provide secured together panels in opposed wall structures of a container or the like, which said panels result in a unique combined reinforcement of the walls of the container or the like to thereby rigidify the same and said walls, along with other opposed walls, presenting a smooth unbroken interior surface for the container or the like and additionally serving as reinforcing means for the container wall structure at and adjacent the respective corners thereof.

Another object of the invention is that the free vertical side edges of the secured together panels extend to and are disposed at the score line defining the corner folds of the body structure and thus reinforce the body structure at and adjacent these corners.

Another object of the invention is to provide a novel blank structure from which the container wall structure is fabricated, the said blank structure consisting of two complementary blank sections formed waste-free from a single sheet or roll of paperboard or the like and which two sections, while in their substantially flat unfolded formation, prior to being assembled into tubular form, each comprises at least three connected together panels, such as a panel intermediate of end panels, the end panels being coextensive in all dimensions with each other, and one of the end panels of one section being permanently secured in completely overlapped or superimposed relation on an end panel of the other section so as to dispose all of the panels of the combined sections in alignment with each other or in flat unfolded end-to-end relationship.

Another object of the invention is to provide the aforesaid body structure with the closure means. The closure means may be foldable flaps integral with one or both opposite edges of certain or all of the panels, and these flaps further may be alternately half and full flaps on one or both of the edges of said panels.

Another object of the invention is to provide closure means in combination with the tubular body structure, the said closure means consisting of flaps at one or both opposite edges of said panels, and the flap closure means serving not only to effectively close one or both ends of the tubular body structure, but additionally to reinforce the said end or ends thereof and further to protect the fold or score lines on which the flaps hinge when the flaps are in their closed position.

Another object of the invention is to provide a new blank structure from which the tube, container or the like is fabricated, the blank being comprised of two complementary sections which, in one embodiment of the invention, are identical and, in the other embodiment of the invention, are substantially identical, the blanks being formed from a single piece, sheet or roll of paperboard or the like and slit transversely and waste-free to thus provide the two said sections.

Another object of the invention is to provide the two blank sections wherein each section is comprised of at least three connected together panels such as an intermediate panel and an end panel at each side thereof, with the end panels of each section being coextensive in overall dimensions with each other and permanently securing one of the end panels in completely overlapping or superposed relation to the end panel of another section while both of the sections are in substantially flat unfolded form, thus disposing the sections or panels comprising the same in alignment with each other or in side-by-side relationship, and the panels comprising the said sections may or may not have the closure flaps integral therewith.

Another object of the invention is to provide a method of forming the blanks consisting of the two aforesaid complementary sections, and the tube or container fabricated from the combined and permanently secured together blank sections.

Still another object is to provide two flat blanks each comprising a plurality of wall forming panels foldable into complementary tubular telescoping sections each with closure flaps on one end forming a container having walls of three panel thickness throughout, four of the panels of each blank being connected together in side-by-side form with two panels hinged in end-to-end relation with two of the side-by-side panels and folded over conterminously thereupon, forming flat unfolded blanks, each with two wall forming panels of double thickness and two of single thickness, the blanks being foldable into telescoping sections complementary to each other with respect to single and double thickness walls.

Another object is to provide two flat blanks foldable into rectangular complementary tubular telescoping sections of a container having walls of three panel thickness throughout, each blank having four panels connected together in side-by-side relation and one blank having four panels connected in end-to-end relation with each of the four side-by-side panels and folded over in conterminous relation thereon, forming a flat unfolded blank of four side-by-side connected together panels of double panel thickness, the panels of the other blank being of single panel thickness throughout.

Another object is to provide a container of three wall panel thickness throughout formed of inner and outer rectangular telescoped sections, each with closure flaps on one end, each section having four connected together side-by-side wall panels, one section having two or more panels connected in end-to-end relation and positioned in conterminous relation over the side-by-side panels to which they are connected, the other section being complementary to the said one section with respect to double and single wall forming panels, the sections being telescoped one over the other with the single panel walls in parallel flatwise relation to the double panel walls.

With the above and other objects in view, the invention consists in the construction and novel combination and arrangement of parts hereinafter fully described, illustrated in the accompanying drawings and pointed out in the claims hereto appended, it being understood that various changes in the form, proportions and minor details of construction, within the scope of the claims, may be resorted to without departing from the spirit or sacrificing any of the advantages of the invention.

In the drawings:

FIG. 1 is a top plan view of the two complemental sections of the blank cut transversely from a sheet, roll or the like;

FIG. 2 shows one section of the blank of FIG. 1 with glue strips applied to the end panels;

FIG. 3 is a top plan view showing the other section of FIG.1 but turned over;

FIG. 4 is a top plan view of the combined blank of FIGS. 2 and 3 and with the end panel of one of the blanks superposed on and permanently secured to the end panel of the other member and forming a flat composite member with the panels thereof in side-by-side relationship;

FIG. 5 is a perspective view showing the blank of FIG. 4 partially assembled into its tubular formation;

FIG. 18 is a top plan view of a further embodiment of the invention showing one section of the blank;

FIG. 19 is a top plan view showing another section of the blank;

FIG. 20 is a top plan view showing the glue on the end panels comprising the section and is a combination of the two sections of blanks of FIGS. 18 and 19 with end panels of each blank superimposed and permanently secured together by the glue or the like and with the panels all in alignment or in flat unfolded end-to-end relationship;

FIG. 21 is a perspective view of the combined blanks in FIG. 20 and showing the same partially assembled into tubular formation;

The invention will be more readily understood by referring to the drawings in detail wherein the same reference numeral or characters all denote the same component parts.

Figure 6:
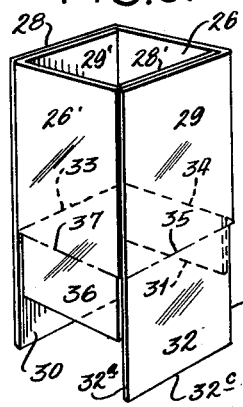
FIG. 6 is a view similar to FIG. 5 and showing a further step in assembling the body or walls constituting the container or tube.

The blanks from which the body structures or sections are fabricated are depicted in FIGS. 1 through 5, and 18 through 21. In FIGS. 1–5 and 18–21 there are two complementary blank sections generally denoted A and B. Each section A is composed of an intermediate panel 26, which panel has connected therewith by a fold line 27 at opposite side edges the respective end panels 28 and 29. The complemental blank section B is likewise composed of an intermediate panel 26′ and respective end panels 28′ and 29′ which are joined to the intermediate panel at the side edges thereof by a fold line denoted 27.

The blank sections A and B are slit from sheets or rolls of paperboard in a substantially waste-free manner. The blanks A and B in FIG. 1 are completely severed from the sheet or roll of paperboard and completely severed transversely thereof along an imaginary line denoted at C—C, it being understood that the space between the opposed edges of the blank sections A and B is somewhat exaggerated in the drawing. When the severance along the line C—C has occurred, and that line being irregular, the respective panels 28, 26 and 29 will then be provided at each of their respective ends with closure flap means 30, 31 and 32 respectively, it being noted that the closure flap 31 which extends from the panel is a half flap whereas the closure flaps 30 and 32 which extend from the respective panels 28 and 29 are full closure flaps.

The closure flaps 30, 31 and 32 are defined with respect to the panels from which they extend by fold lines 33, 34 and 35 respectively. The said fold lines are irregular or staggered in that the fold line 33 is slightly outwardly of the panel 28 with respect to the fold line 35 which is slightly inwardly of its panel 29 whereas the fold line 34 is substantially intermediate these fold lines 33 and 35, the purpose of the staggered arrangement of the said fold linees 33, 34 and 35 being that when the closure flaps 30, 31 and 32 are folded inwardly after the container wall structure has been assembled, they provide folding clearance for each other and result in a substantially flat end closure. If desired, the line of severance C between flaps 31 and 36 may be shifted to increase the length of one of these flaps and proportionately decrease the length of the other.

The panels 28′ and 29′ of the blank section B are devoid of any flap structure at their respective ends. The intermediate panel 26′, however, of the blank section B does have a half closure flap 36 that extends from an inner end thereof and is defined with respect to its panel 26′ by the fold line 37.

In assembling the blank sections A and B such as disclosed in FIGS. 2, 3 and 4, the blank section B in FIG. 2 has been turned completely over from the position shown in FIG. 1. In this turned-over position, the panel 29′ of the blank B is superimposed or completely overlapped with the panel 28 of the blank section A and these two panels are permanently united together by means of the glue G, and which glue while shown in strip form may cover the entire surface of the panel 28 or the inner face of 29′ as desired. It is to be noted that when the said panels 29′ and 28 have been so permanently secured together as shown in FIG. 4, these panels are coextensive in dimensions and, therefore, completely overlap or superimpose each other in flat unfolded form. The panels 28 and 29 of blank section A are coextensive in dimensions with their corresponding end panels 28′ and 29′ respectively of blank section B. The intermediate panel 26, however, of blank A is slightly wider than its corresponding intermediate panel 26′ of blank B to provide folding clearance.

Figure 17:
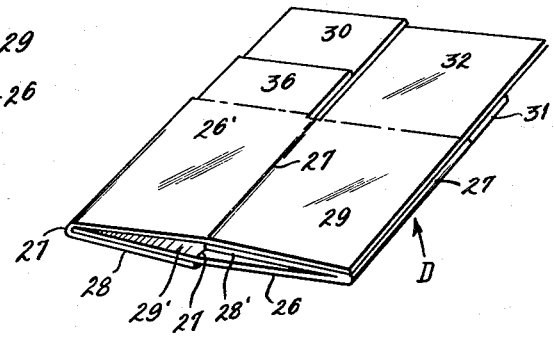
FIG. 17 is a view in perspective showing the body structure of FIG. 6 with flaps in its collapsed condition.

When the blank sections A and B have thus been joined together, thereby disposing the panels in alignment with each other or in side-by-side flat unfolded relationship, the single composite blank consisting of the sections A and B is now ready for assembly and a partial assembly being shown in FIG. 5 wherein the panels have been folded into substantially tubular form, and further into the completed tubular form as shown in FIG. 6 wherein there is disclosed the united together panels 28, 29′ and 28′, 29 which form opposed double wall structures in the tubular body structure whereas the opposed walls 26 and 26′ each consist of a single panel. From the tubular form as shown in FIG. 6, the body and flap structure can be collapsed as shown in FIG. 17 for shipment to the user.

Figure 7:
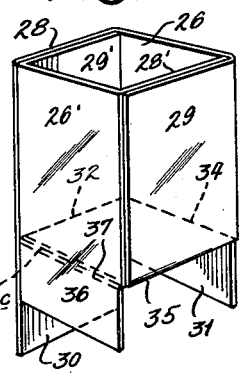
FIG. 7 is a view similar to FIG. 6 and showing one of the closure flaps in position.
Figure 8:
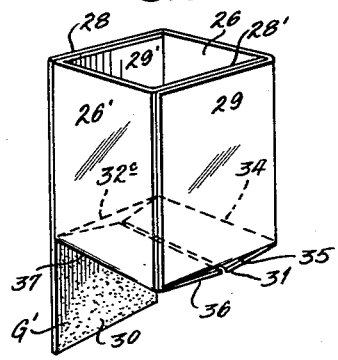
FIG. 8 is a view similar to FIG. 7 showing opposed closure flaps also in position.

When the tubular structure has been assembled such as shown in FIG. 6, the flap structures carried by the panels are now ready to be folded inwardly to provide the closure at one end of the body structure. This is accomplished by first folding in the closure flap 32 on its fold line 35, FIG. 7, then infolding the half flaps 36 and 31 on their respective fold lines 37, 34, FIG. 8, and finally folding inwardly the flap 30 on its fold line 33, FIG. 9, it being understood that prior to folding in the flap 30 it has glue G′ applied to a part or all of the surface thereof so that when so glued to the outer surface of the half flaps 36, 31, the entire end structure is then permanently sealed and held together.

Figure 9:
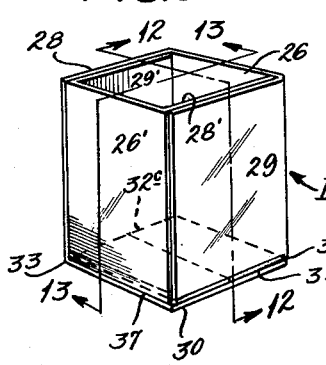
FIG. 9 is a view similar to FIG. 8 but showing the final closure flap in position and thus completing the inner body structure.
Figure 10:
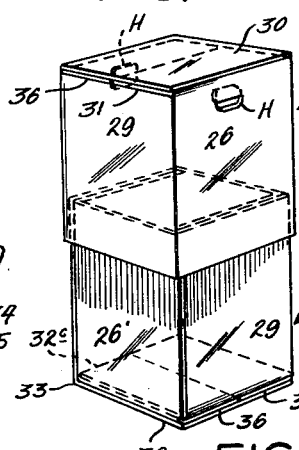
FIG. 10 is a perspective view showing the inner body structure as in FIG. 9 and a complemental, similarly formed outer body structure about to be telescoped thereon and the latter being provided with hand holes.
Figure 11:
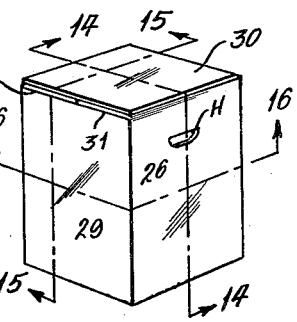
FIG. 11 is a perspective view showing the inner and outer body structures completely telescoped one within the other.

When completely assembled as in FIG. 9, there results an inner body section denoted generally at D, which when complemented by an outer body section E which is of slightly greater interior dimensions than the exterior dimensions of the inner body structure or section D enables these two body structures with or without closure means at their respective ends to be fully telescoped together, and when closure means are utilized, results in the container as shown in FIG. 11. The outer body section E is formed and assembled precisely as the inner body section D with the exception of the hand holes H being provided in the opposed single panel walls 26 and 26′.

In telescoping the body sections D and E, it will be understood that one of the said sections will be rotated 90° with respect to the other section so that the opposed single panel walls 26 and 26′ will be in snug parallel relationship with the double panel wall structures 28, 29′ and 28′, 29 respectively. It will be understood that when the two sections D and E are telescoped together, there is indeed a very snug engagement between the inner and outer walls of these sections which absolutely prevents any accidental disassociation of the telescoped sections. When the two sections have been telescoped, it is preferable in some instances to place a conventional encircling band, not shown, thereabout. Obviously the band holes H facilitate separation of the telescoped sections D and E.

Figure 12:
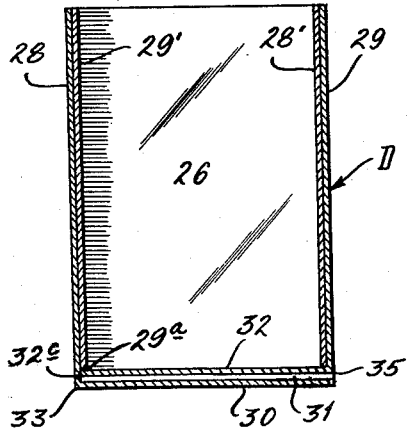
FIG. 12 is a vertical sectional view taken along the lines 12—12 of FIG. 9 and looking in the direction of the arrows.
Figure 13:
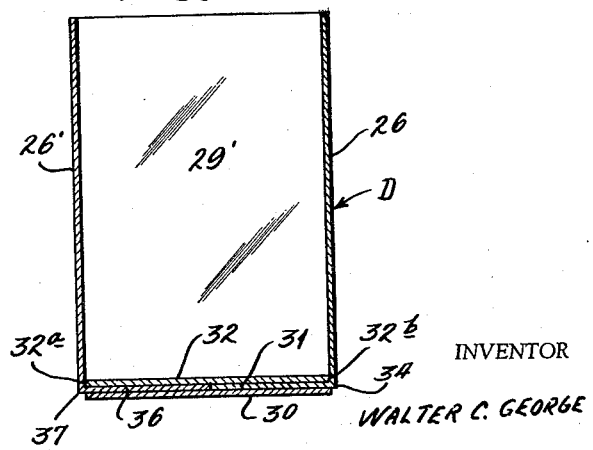
FIG. 13 is also a vertical sectional view taken along the lines 13—13 of FIG. 9 looking in the dierction of the arrows.

The vertical sectional views in FIGS. 12 and 13 disclose the manner in which the flaps 30, 31 and 32 of blank A and 36 of blank B are folded to provide the substantially flat and reinforced end closure. As shown in FIG. 13, the opposite side edges 32a and 32b of flap 32 are each disposed inwardly of the fold line or corner 37 and 34 respectively and thus protect those fold lines especially where such articles as nails, spikes, screws, etc. are packed in the container and, moreover, these said edges being so disposed, reinforce the end structure and the adjacent panels. In FIG. 12, the end 29a of the panel 29′ is disposed in spaced relation to the corner 33 of the fold of panel 28 and flap 30. The end portion 32c of the flap 32 is disposed beneath the extreme end edge 29a of the panel 29′ slightly inwardly of the score produced by the corner fold 33. An end portion 31a of the flap 31 extends directly beneath the portion 32c of the flap 32 and the flap 31 is substantially coextensive in length with the length of the flap 32. This extreme end portion 31a of the flap 31 is disposed in the score that produces the fold 33 and protects that score and reinforces the entire corner structure and the adjacent portion of the panel 28.

Figure 14:
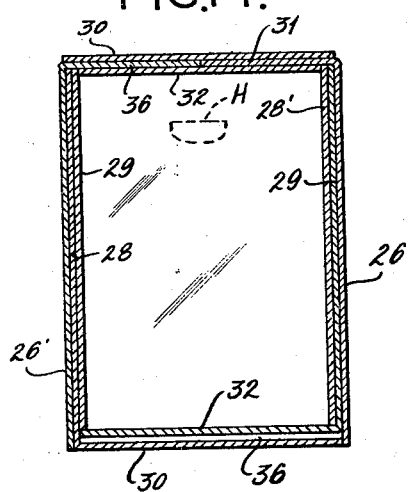
FIG. 14 is a vertical sectional view taken along the line 14—14 of FIG. 11 looking in the direction of the arrows.
Figure 15:
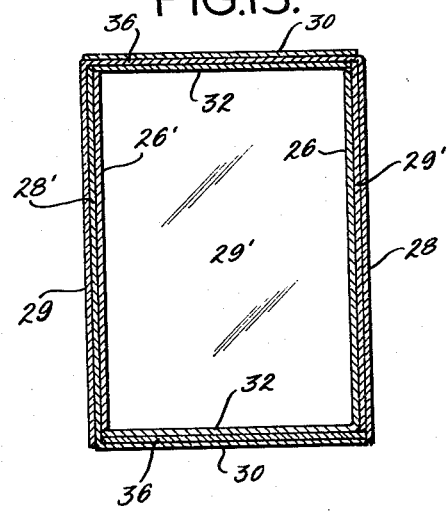
FIG. 15 is a vertical sectional view taken along the line 15—15 of FIG. 11 looking in the direction of the arrows.

The vertical sectional view as shown in FIG. 14, which is taken along the line 14—14 of FIG. 11, shows the relationship of the panels of the inner and outer body sections D and E and the disposition of the closure flaps 30, 31, 32 and 36 for each of these body sections. In FIG. 15, taken on the line 15—15 also from FIG. 11, the aforesaid relationship of the body panels and closure flaps also is disclosed.

Figure 16:
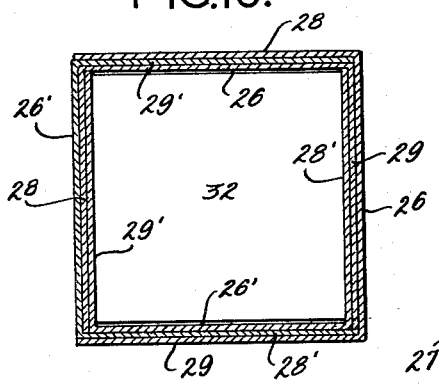
FIG. 16 is a transverse sectional view taken along the line 16—16 of FIG. 11.

As regards FIGS. 14, 15 and 16, the same disclose the fully telescoped inner and outer body sections D and E. From FIG. 14 it will be seen that the opposed three panel wall structure to the left consists of the panels 26', 28 and 29' whereas the wall structure opposed thereto from the exterior to the interior consists of the panels 26, 29 and 28' and in this wall structure the panels 28 and 29' are permanently secured together and the opposed panels 28' and 29 also are permanently secured together such as by adhesive, stitching or other means. The closure flap arrangement in FIG. 14 at the bottom discloses the flap 32 as a continuation of the panel 29 and the outer flap 30 as a continuation of the panel 28 and the half flap 36 which is between the inner full flap 32 and the outer full flap 30. The upper flap structure in FIG. 14 discloses the inner full flap 32 with its side edges in engagement with the opposite edge portions of opposed inner wall 28' and 29' and with the half flaps 36 and 31 integral with the panels 26' and 26 respectively and the full outer flap 30 which is, of course, integral with the panel 28.

With regard to FIG. 16, which is a transverse or cross sectional view along the line 16—16 of FIG. 11, it will be seen that the opposed panels constituting the body structure consist of inner panel 26', intermediate panel 28' and outer panel 29 and opposite which there are the inner panel 26, the intermediate panel 29' and the outer panel 28. The panels 29 and 28' are permanently secured together such as by adhesive as are the panels 28 and 29'. In the other opposed walls, which also each consist of the three panels, to the left FIG. 16, the outer wall is 26', the intermediate wall 28 and the inner wall 29', the two latter walls being permanently secured together such as by adhesive or the like, and opposite this three panel wall structure there is the wall which is comprised of the inner panel 28', the intermediate panel 29 and the outer panel 26, and panels 28' and 29 are permanently secured together as by an adhesive or the like.

As to the embodiment of the invention as disclosed in FIG. 18, the blank disclosed therein and the blank disclosed in FIG. 19 have been cut waste-free from a sheet or roll of paperboard or the like. The blank section A in FIG. 18 is composed of the intermediate panel 26 and the end panels 28 and 29 which are each integral with the respective side edges of the intermediate panel 26 and the panels are foldable on the fold lines 27 the same as in the hereinbefore mentioned blank section A in FIGS. 1, 2 and 3. However, the dimensions of the said body panels 26, 28 and 29 slightly differ from the dimensions of the body panels A in FIGS. 1, 2 and 3.

Closure flaps 38, 39 and 40 which are integral with and substantially coextensive in length with the panels 28, 26 and 29 respectively are defined with respect to the said panels by means of scored fold lines 41, 42 and 43. Corresponding flaps 44, 45 and 46 also integral with the panels 28, 26 and 29 respectively are likewise defined by means of scored fold lines 47, 48 and 49.

As to the section of the blank B shown in FIG. 19, it, too, is provided with the same flaps and scored fold lines as those shown in FIG. 18, and these flaps are denoted at 38', 39' and 40' and are defined with respect to the panels 28', 26' and 29' by means of the scored fold lines 41', 42' and 43'. Other flaps on the blank B denoted 44', 45' and 46' are defined with respect to the panels 28', 26' and 29' respectively by means of the scored fold lines 47', 48' and 49'. In order to define the flaps with respect to the body panels in both of the blank sections A and B, the same are slit as at S. The overall width of the flaps 41 to 46 inclusive in the blank A, FIG. 18, is slightly greater than the corresponding width of the flaps 38', 39', 40', 44', 45' and 46' in blank B, FIG. 19. This difference in width of the said flaps is denoted at W in FIG. 20, and provides folding clearance for the flaps.

As shown in FIG. 20, the body panel 29' of the blank B is superimposed on and completely covers and is permanently adhesively secured by glue or the like G to the complemental body panel 28 thus disposing the panels 28', 26', 29', 26 and 29 in alignment or side-by-side flat unfolded relationship with respect to each other.

As hereinbefore noted in connection with the blanks A and B of FIGS. 2, 3 and 4, the intermediate panel 26 of blank A is slightly wider than the intermediate panel 26' of blank B to provide folding clearance about the side edges of panels 28' and 29' which are superimposed on and completely cover the panels 29 and 28 respectively to which panel 26 is integrally connected.

The two blank sections A and B as joined together, FIG. 20, are shown as partially assembled into tubular form, FIG. 21, by folding the panels as hereinbefore described and particularly in connection with the description of FIG. 5.

Figure 22:
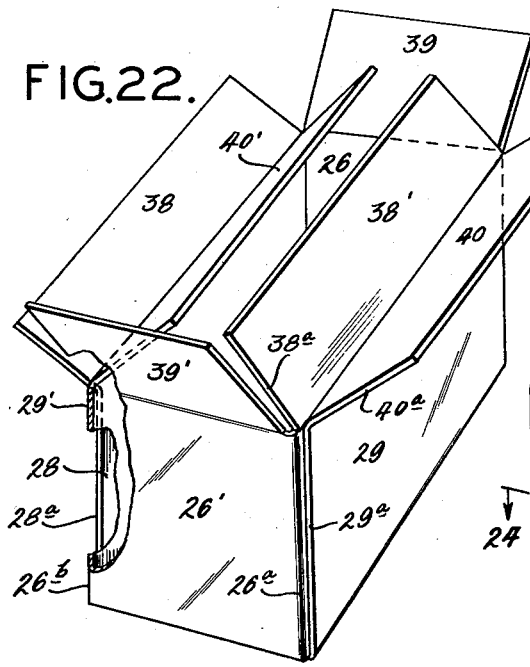
FIG. 22 is a perspective view showing the container body fully assembled and with the upper closure flaps in position to be closed and, of course, the lower flaps already closed.
Figure 23:
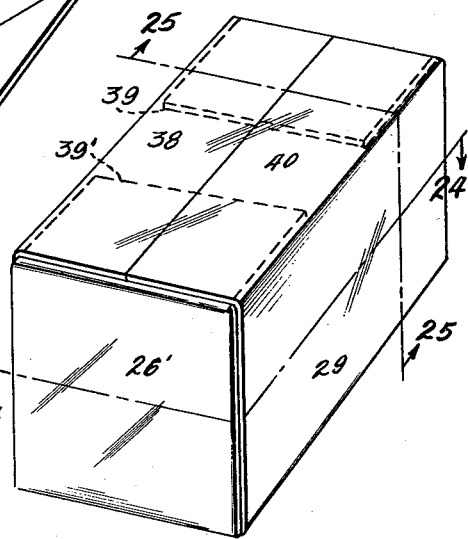
FIG. 23 is a perspective view of the fully assembled and closed container of FIG. 22.
Figure 24:
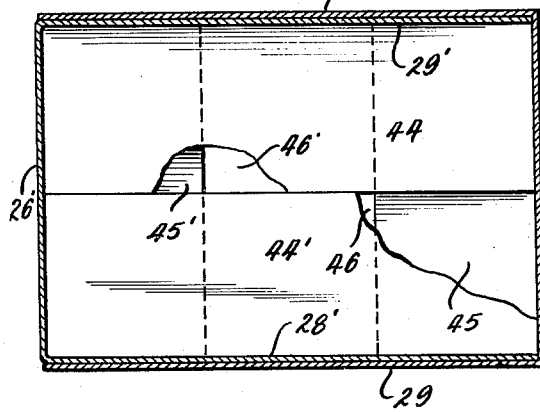
FIG. 24 is a longitudinal sectional view taken along the lines 24—24 of FIG. 23 looking in the direction of the arrows.
Figure 25:
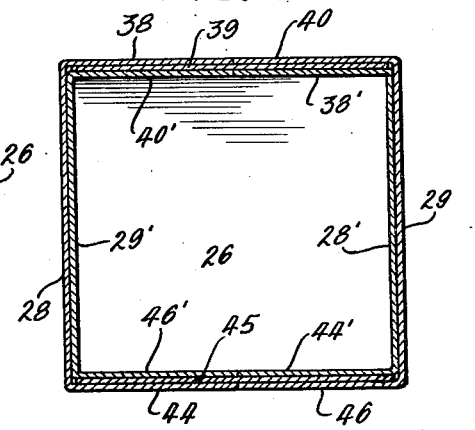
FIG. 25 is a vertical sectional view taken along the line 25—25 of FIG. 23 looking in the direction of the arrows.

In FIG. 22, the container is completely assembled and in partially closed condition. In closing the container as shown in FIG. 22, the complemental flaps 40' and 38' are first folded inwardly until their respective free edges substantially abut and then the closure flaps 39' and 39 are folded inwardly to contact adjacent portions of the flaps 40' and 38' and when that is done, the final closing effect is obtained by folding inwardly the flaps 38 and 40 and are secured to flaps 39 and 39' by glue or the like, and when that is done, the container is completely sealed as shown in FIG. 23. It is to be noted that the free edge 29a of the panel 29 terminates slightly inwardly of the corner 26a of the panel 26'. Thus the edge 38a of the panel 38' projects slightly beyond the edge 40a of the panel 40, FIG. 22, and this same structure obtains on both sides, so to speak, of the container as will be seen from the other side that the edge 28a of the panel 28 is slightly inwardly disposed with respect to the corner 26b.

The manner of folding the flaps 44, 44', 45, 45', 46 and 46' is precisely the same as the folding of the flaps 38, 40, 39, 39', 40' and 38'. The folding of the flaps and the formation of the walls of the container depicted in FIGS. 22 through 25 results in double panel side wall structures, single panel end wall structures and three panel closure structures at the adjacent end portions of the container.

In FIG. 2, the glue strips G are shown respectively on the end panels 28, 29 and the same in FIG. 18. It is understood that the panel 29' can be superimposed on the panel 28 and glued thereto or the panel 28' can be superimposed and glued to the panel 29, FIG. 4. In FIG. 20, the panel 29' has been superimposed and glued to the panel 28 whereas the panel 28' could be applied and secured to the panel 29. So, it is understood that only one of the panels 28, 29, FIGS. 3 and 20, need have the glue applied thereto preliminarily to forming the composite blank from the blank sections A and B.

As hereinbefore described, the closure flaps 38, 39, 40, 44, 45 and 46 are slightly wider than the corresponding flaps 38', 39', 40', 44', 45' and 46' of blank B of FIG. 19 and the end panel 26 is slightly wider than the end panel 26' for folding clearance.

This form of the invention may be modified by forming both blanks of FIGS. 18 and 19 respectively substantially identical throughout. That is, the corresponding closure flaps, intermediate and end panels will be of substantially the same dimensions. The blanks A and B are joined together initially as hereinbefore described by superimposing and permanently securing panel 29' in completely overlapping form to panel 28 and then applying glue to panel 28' and assembling the blank into tubular form by permanently securing the outer face of end panel 29 to the inner face of the end panel 28', thus forming the opposed wall of the tubular structure with panels 28' and 29' in the reverse position shown in FIGS. 21 and 22 with respect to their inner and outer faces.

This modified form is more especially adapted to substantially square containers and particularly to forming collapsible top and bottom telescoping body sections similar to those illustrated in FIGS. 6 to 11 inclusive, wherein each of the walls of the fully telescoped container comprise three panels and the end closure of the three sets of complementary closure flaps, as clearly illustrated in FIGS. 14, 15 and 16.

It will be noted that one or both telescoping sections of the several embodiments of the invention forming the containers of three panel wall thickness throughout are formed from flat unfolded blanks scored to define wall forming panels, each comprising four or more panels connected together in side-by-side relation with one or more panels folded in flatwise conterminous relation over at least one of the side-by-side panels. These preformed flat blanks result in important economies since they reduce the preassembly operation to the simple step of securing the end panels of the flat blanks together to form four-sided sections which may be collapsed in flat form for shipment. At the point of use all that is necessary is to open the collapsed preformed sections into rectangular form and telescope the outer section over the inner section. It should be understood that one end of each of the sections of any of the embodiments of the invention may be provided with half closure flaps, full closure flaps, combinations thereof or any other type of closure desired.

While the drawings depict the paperboard as being of solid fibreboard, it is understood that all embodiments of the invention may be fabricated from conventional doubleface or doublewall corrugated paperboard.

The composite flat unfolded blanks of FIGS. 4 and 20 and the described modifications thereof are adapted to be assembled into tubular form on high-speed conventional paperboard assembling machines.

Although I have illustrated and described several presently preferred embodiments of the invention, it will be recognized that changes in the details and arrangements may be made without departing from the spirit of the invention or the scope of the appended claims.

What I claim is:

1. A telescopic container consisting of two collapsible tubular body sections, substantially square in shape, each section consisting of two wall structures, each comprising three integral side-by-side connected together wall panels of substantially equal dimensions, the wall structures being positioned in side-by-side alignment with an outer panel of one structure conterminously overlapping the adjacent outer panel of the other wall structure and permanently secured thereto, the other pair of outer panels being similarly permanently secured together forming a tubular section, each outer panel of each pair of overlapped panels having a full integral closure flap on one end only, each opposed intermediate panel of each wall structure having an integral half closure flap on its corresponding end, the full length closure flaps being folded inwardly at substantially right angles to the wall panels with the half length flaps interposed therebetween, forming a three-ply bottom closure to said body section.

2. The body structure for containers, tubes and the like as defined in and by claim 1 wherein the overlapped panels each has a free edge, the said edge of one of the overlapped panels being disposed at the fold line of an adjacent panel, and the free edge of the other overlapped panel being disposed exteriorly of the fold line of said first mentioned panel.

References Cited in the file of this patent

UNITED STATES PATENTS

| | | |
|---|---|---|
| Re. 21,287 | Jonas | Dec. 5, 1939 |
| 1,863,259 | Van Buren | June 14, 1932 |
| 2,354,239 | Williamson | July 25, 1944 |
| 2,496,043 | Farrell | Jan. 31, 1950 |
| 2,521,989 | McPherson | Sept. 12, 1950 |
| 2,556,915 | Guyer | June 12, 1951 |
| 2,565,682 | Guyer | Aug. 28, 1951 |
| 2,759,651 | Dowd | Aug. 21, 1956 |
| 2,761,608 | Welshenbach | Sept. 4, 1956 |
| 2,761,610 | Welshenbach | Sept. 4, 1956 |
| 2,880,866 | Van Dyck | Apr. 7, 1959 |